May 20, 1958  T. TOVROG ET AL  2,835,477
TEMPERATURE CONTROL APPARATUS AND METHOD
Filed May 2, 1955  3 Sheets-Sheet 1

INVENTORS
Theodore Tovrog
Arthur A. Krawetz
BY
Attorneys

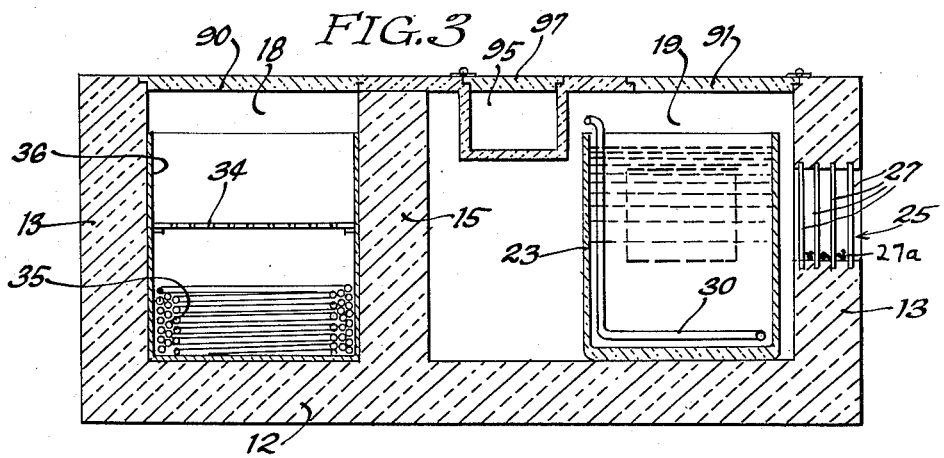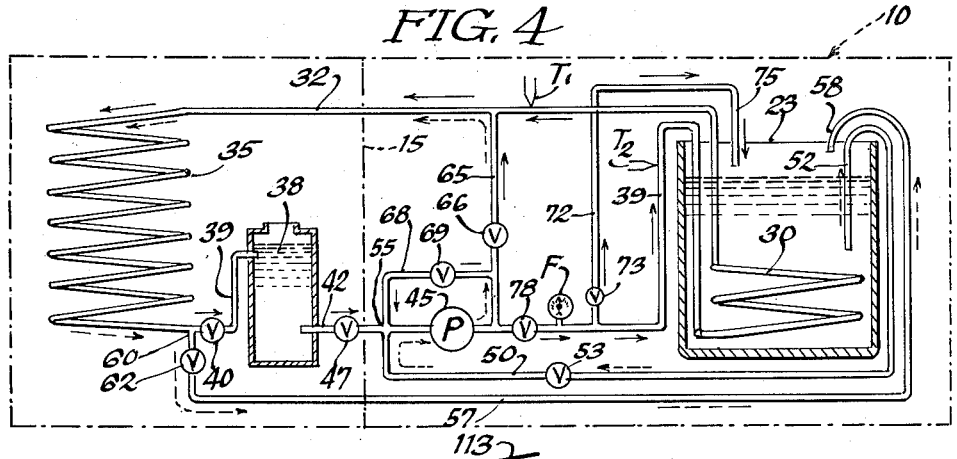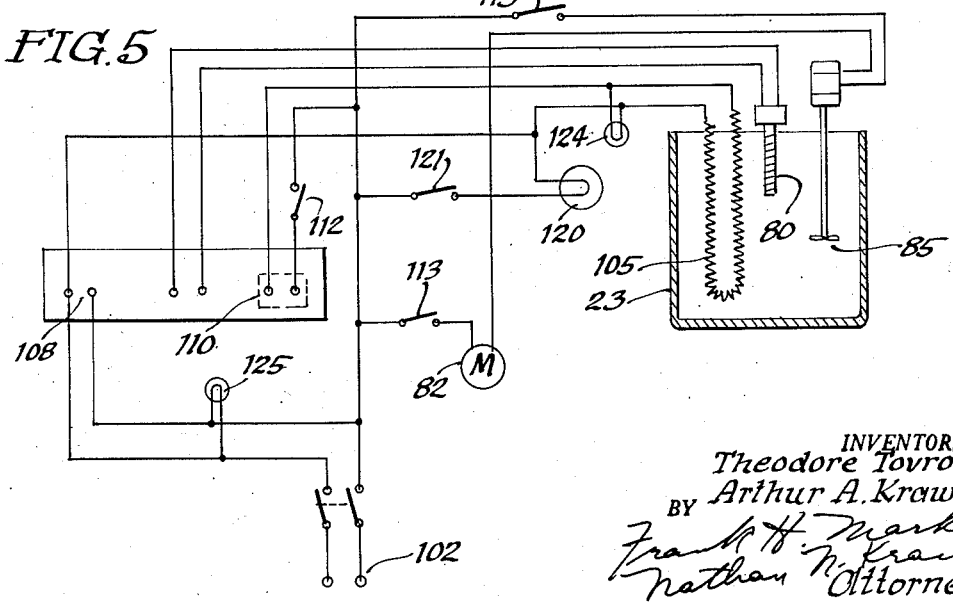

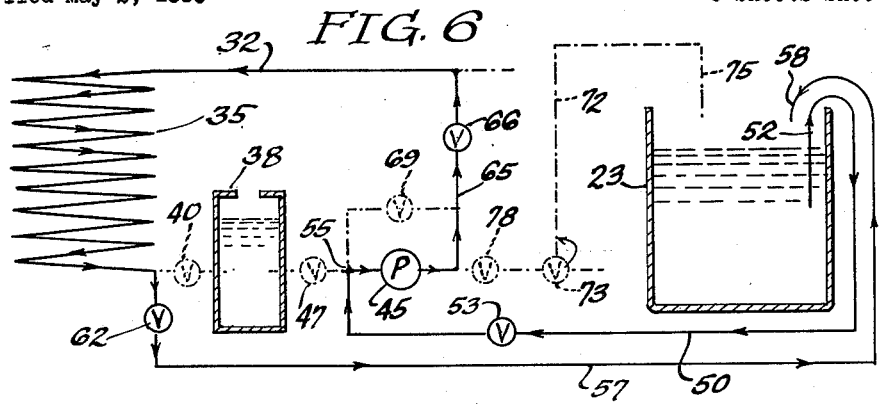
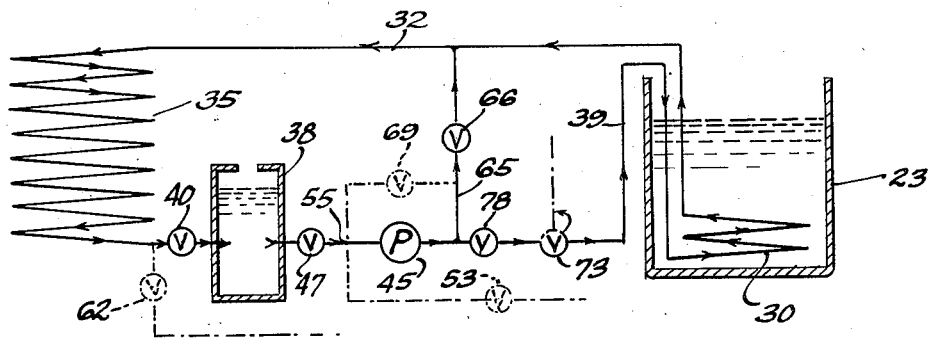
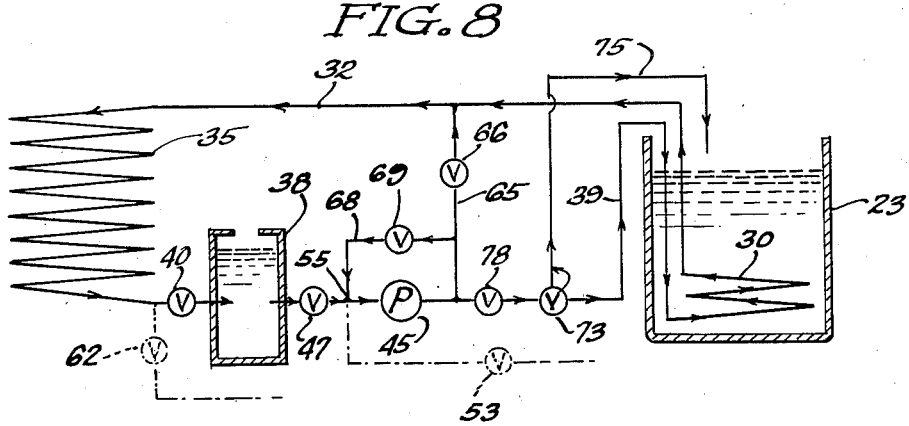

United States Patent Office 2,835,477
Patented May 20, 1958

2,835,477

TEMPERATURE CONTROL APPARATUS AND METHOD

Theodore Tovrog, Chicago, and Arthur A. Krawetz, Evanston, Ill.

Application May 2, 1955, Serial No. 505,097

8 Claims. (Cl. 257—4)

Our invention relates to apparatus and method for maintaining a closely controlled temperature in a bath. The preferred application of our invention is in maintaining a relatively low temperature, such as is useful in making physical tests on samples of petroleum and its derivatives and analogous products, for example, for testing flow rate. However, it will be understood by those skilled in the art that our invention is equally applicable for maintaining temperatures at any desired high or low value where a bath is employed.

In a preferred embodiment of our invention we provide a bath of a certain liquid in which is immersed a test sample, and the temperature of said liquid bath is controlled by means of a temperature-control conduit, such as a hollow coil immersed in said bath, through which coil is circulated the same material as that which makes up said bath. The fluid within the aforesaid temperature-control conduit is circulated, by means of a pump or the like, to and from a heat exchange unit where the temperature of the fluid within said conduit is adjusted to the desired value, the aforesaid circulation being thermostatically controlled.

As a special feature of our invention, the fluid within the bath itself may preliminarily be withdrawn and circulated to the same heat exchange unit as that which adjusts the temperature within the aforesaid conduit, and a common reservoir is provided to supply the bath itself as well as the temperature-controlling conduit, suitable bypasses being provided which are opened or closed as the necessities of the situation demand. We are thus able to obtain an extremely rapid temperature adjustment starting from room temperature, and, when desired, we are able to make any further radical temperature adjustments with a minimum loss of time. After the bath temperature has been adjusted, the circulation of the bath liquid is discontinued and thereafter the temperature is maintained by the control coil.

Various other advantages will become apparent as the description proceeds.

Referring now to the drawings forming part of this specification and illustrating a preferred embodiment of our invention—

Fig. 3 is a fragmentary vertical sectional view thereof taken substantially along the line 3—3 of Fig. 2;

Fig. 4 is a diagrammatic elevational view of the circulation system for the temperature-controlling fluid;

Fig. 5 is an electrical wiring diagram which we have found applicable to our invention; and Figs. 6, 7 and 8 are diagrams illustrating flow of heat exchange fluid through our system at various stages of operation.

Figure 1:
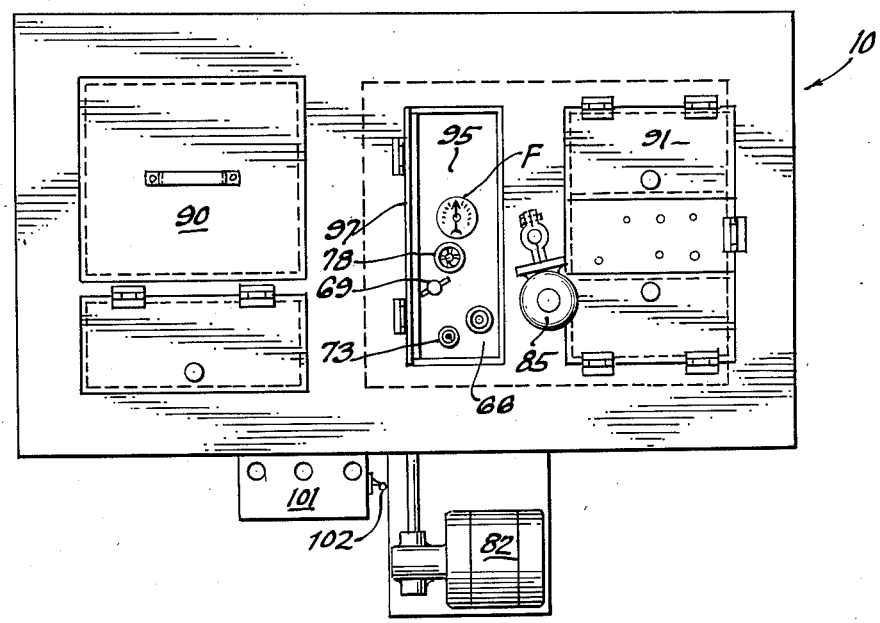
Fig. 1 is a top plan view of a preferred apparatus embodying our invention, the same being completely closed, as in operation.
Figure 2:
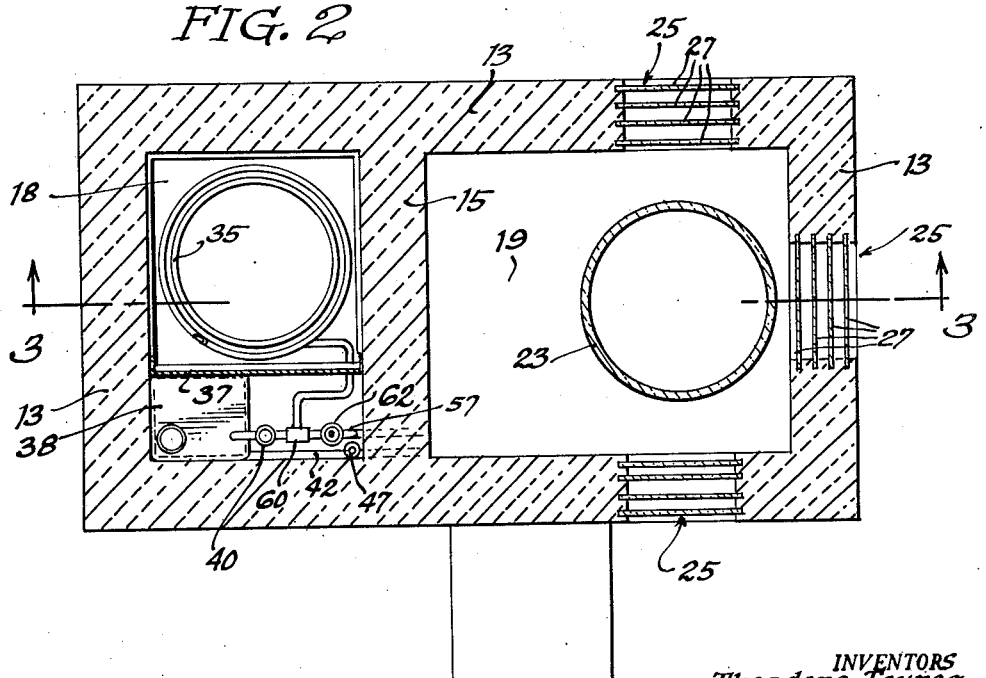
Fig. 2 is a horizontal sectional view of the same.

Numeral 10 indicates a suitable housing for our improved apparatus, the same preferably comprising a rectangular container having an insulated bottom wall 12 and insulated side walls 13 and an insulated vertical partition 15 defining chambers 18 and 19 (Figs. 2 and 3). The chamber 18 may be referred to as the temperature-adjusting chamber, while the chamber 19 may be designated as the bath chamber, a suitable container 23, such as an open top tank, preferably of glass, being disposed therein.

To permit convenient inspection from outside the apparatus, a plurality of windows 25 are provided in the side and end walls of the bath chamber 19. These windows are so formed as to provide satisfactory insulation between the inside and outside of chamber 19. We have found that the use of a plurality of spaced panes 27 of glass or like transparent material in the apertures forming said windows provides adequate visibility and at the same time effectively prevents passage of heat. We also find it desirable to dispose a suitable desiccant 27a between the panes 27, preferably at the bottom of said spaces, in order to prevent condensation of such moisture as may leak into said spaces, even though the panes are sealed as effectively as possible by a suitable mastic within said openings.

Disposed within the container 23 is a coil 30 forming part of the conduit for the temperature-adjusting fluid. Said coil 30 discharges via a conduit 32 through the partition 15 and into the chamber 18, where it leads into a coil 35 which is arranged vertically within a metal tank 36 disposed in said chamber. This metal liner aids in maintaining a constant temperature within chamber 18.

In our preferred embodiment solid carbon dioxide, "Dry Ice," is preferably disposed on a perforated removable shelf 34 arranged above the coil 35 for heat exchange purposes, the cold $CO_2$ gas dropping through the shelf to make effective the heat-exchanging contact with coil 35. It will be understood, however, that other suitable heat exchange material or means may be provided, depending on the particular use to which the apparatus is to be put. If desired for lower temperatures and quicker heat transfer, the solid $CO_2$ might be packed in direct contact with coil 35, with or without a suitable $CO_2$ solvent. Also, the coil 35 might, if desired, be wound around one side of a metal cylinder and on the opposite side thereof might be wound a coil containing either a suitable refrigerant fluid, such as one of the well known refrigerant gases which is connected to a refrigerating system, or, if the temperature is to be elevated, then a steam coil or the like. Such variations are considered within the scope of our invention.

The lower extremity of the coil 35 discharges to a reservoir 38 by means of a conduit 39, a suitable valve 40 being disposed therein. The reservoir is preferably separated from chamber 18, as by a metal partition 37, in order that the fluid therein need not be subjected to the radical temperature adjustment as that in coil 35.

The reservoir 38 discharges into a conduit 42 which leads through a pump 45 back to the bath coil 30, a valve 47 being interposed between the reservoir and pump.

Means is provided for circulating the bath fluid, for temperature-adjusting purposes, comprising an open conduit 50 which extends below the surface of said fluid within the container 23 for withdrawing liquid therefrom, as indicated at 52, said conduit being connected to the conduit 39 between the valve 47 and pump 45, as indicated by X-fitting 55, a valve 53 being disposed in conduit 50.

A return conduit 57 is provided for discharging bath fluid back to the tank 23, as shown at 58, said conduit joining the conduit 39, as at 60, a short distance beyond the coil 35. A valve 62 is provided in the return conduit 57.

A by-pass conduit 65 leads from the conduit 39, on the discharge side of pump 45, to conduit 32, a valve 66 being provided in said by-pass, and a by-pass 68 connects the conduit 65 to conduit 39, as at the X-fitting 55, a valve 69 being provided therein.

A bleeder by-pass conduit 72 is preferably provided to take care of the eventuality of a possible vapor lock in coil 32, said bleeder 72 being connected to a valve 73 in conduit 39 and discharging to the tank 23, as at 75. A suitable valve 78 is provided in conduit 39 between the valve 73 and the pump 45.

A suitable temperature indicator T is provided in conduit 32 and in the conduit 39 we provide a suitable pressure or flow-rate indicator F.

It should be understood that the output of pump 45 is constant, said pump being actuated by constant speed motor 82. However, the amount of heat exchange fluid which is being circulated may vary both in the bath and in the coil 30, as will hereinafter be described.

When our invention is being employed for low temperature, the preferred coolant is an approximately 50—50 mixture of isopropyl alcohol and acetone both in the bath and coil 30.

Suitable hinged and removable covers 90 and 91 are provided for chambers 18 and 19, respectively, said covers being preferably of insulating material, such as wood, etc.

We provide a separate compartment 95 in the top of chamber 19 and preferably insulated from it, wherein are disposed the bath coolant valve 53, non-chilling by-pass valve 69, chilling by-pass valve 66, cooling coil valve 78, bleeder valve 73 and pressure or flow-rate indicator F. This compartment is closed by an insulated cover 97. Thus, these elements are readily accessible and are protected from excessive temperatures.

A box 101 is provided on the outside of the housing 10 for the various electrical controls, the entire electrical system being actuated by means of a toggle switch 102.

The wiring diagram shown in Fig. 5 is believed to be more or less self-explanatory.

It will be noted that within the bath container 23 we provide a thermo-responsive element 80 of suitable design for controlling the bath temperature through response to said temperature through a heater 105 arranged in the bath. A motor-controlled stirrer 85 is also arranged in the bath container 23.

The main switch 102 is a double-pole single-throw switch which acts to energize the system. A relay 108 is disposed in the circuit between heater 105 and the thermo-responsive element 80 via heater switch 110. The pump 45 is constantly driven by means of the electrical motor 82 once the circuit has been closed. The heater 105 and stirrer 85 may individually be thrown in or out of the electrical circuit by means of individual manual switches 112 and 113, respectively. So that the pump motor may be separately cut out if desired, a switch 118 is provided.

Electrical lamps may be provided for illumination where desired in the system, and we have indicated a number of such lamps arranged in parallel in the circuit as, for example, a lamp 120 disposed within the bath chamber 19 and controlled by means of a switch 121, and pilot lights 124 and 125 disposed on the cabinet, one to indicate passage of current through the heater and the other to indicate that the current is flowing throughout the system.

Although not so indicated, grounding is provided for purposes of safety.

We have found that the following procedure is highly effective for maintaing a low temperature suitable for conducting flow tests for petroleum products and the like. The temperature-adjusting chamber 18 is charged with solid carbon dioxide, as explained above, either by disposing the solid refrigerant on shelf 34 or packing it in direct contact with coil 35. The reservoir 38 and bath container 23 are then charged with a suitable coolant liquid. Then, with the valves 40, 47, 78 and 69 closed and valves 62, 53 and 66 open (Fig. 6), the pump is placed in operation, whereupon coolant from the bath will be pumped from the bath through conduit 50—52 to the heat exchange coil 35 and back to the bath through return conduit 57—58. This circulation is continued until the approximate desired temperature is reached in the bath. If necessary to purge the system of a vapor lock, bleeder valve 73 and valve 78 are opened to permit escape of coolant fluid to the bath via conduit 72—75.

After the approximate desired temperature has been attained in the bath, valves 53 and 62 are closed and valves 47, 40 and 78 are opened (Fig. 7). Continued operation of the pump will now circulate coolant through the coil 30, the coolant flowing from the pump 45 through the coil 30 and by-pass 65 to the temperature-adjusting coil 35, then into the reservoir 38 and back to the pump and on to the coil 30 via conduit 39.

Optimum operating conditions may now be attained by adjusting valves 66 and 78, which regulates flow through coil 30, and valve 69, which controls flow through coil 35. Valve 69 controls the amount of fluid passing through the non-chilling by-pass. Such optimum conditions may readily be reached by observation of the temperature-indicating elements $T_1$, $T_2$.

When the system has been adjusted to a desired operating temperature, the cooling effect of coil 30 on the bath will, when necessary, actuate the heater 105. It will be understood that the desired temperature control will depend on an optimum balance between the cooling effect of coil 30, heater rating of the element 105 and sensitivity of the heater-actuating circuit. The valves 66 and 78 can be used to control the rate of cooling of the bath.

The noting of coolant temperatures in various parts of the system together with the pressures or flow rates at indicator F, will after relatively slight experience in the operation of the system make it possible to reproduce the desired conditions for repeated operation at any predetermined controlled temperature.

We have found that at various temperatures down to —65° F. it has been possible with the system described above to maintain an adjusted temperature within limits of plus or minus 0.05° F. for periods up to 8 hours duration, and presumably such temperatures could be indefinitely maintained.

Furthermore, by operation of the system in the manner described above, we have found it possible to obtain a desired adjusted temperature within a relatively short period. Thus, we are able to effect a great saving in the time of highly skilled technicians and greatly to increase their productivity.

We contemplate that the invention described herein may also be applied to an air conditioning system, wherein the air of an enclosure may take the place of the bath 23, air being the fluid in both the open and closed conduits.

Various changes and modifications coming within the spirit of our invention will doubtless suggest themselves to those skilled in the art. Hence, we do not wish to be limited to the specific form shown or uses mentioned, except as indicated in the appended claims.

We claim:

1. A method of adjusting and controlling a bath temperature in an open top bath for testing materials, comprising initially withdrawing heat exchange liquid from the bath, changing the temperature of the liquid in a first direction and returning the liquid to the bath, until the temperature of said liquid has been changed to about a predetermined value, then circulating part of said liquid through said bath but out of direct contact with the liquid in the bath while changing the temperature of the circulating liquid in the same direction as aforementioned, continuing the circulation, and maintaining the temperature of the bath at about the predetermined value by changing the temperature of the liquid in the bath in a direction opposite said first direction when the temperature of the bath varies from about said predetermined value, one of said directions representing an increase in temperature, the other of said directions representing a decrease in temperature.

2. A method as defined in claim 1 wherein after the temperature of the bath has been initially adjusted, part of the liquid circulating through the bath out of direct contact with the liquid in the bath does not have its temperature changed thereby avoiding excessive revision of the temperature of the bath.

3. A method as defined in claim 1 wherein said first direction represents a decrease in temperature and said opposite direction represents an increase in temperature.

4. In apparatus for testing samples of material, a temperature-regulating bath comprising an open-top container, a heat exchanger, an open conduit for conducting heat exchange liquid from the bath to said exchanger and back to the bath, a closed conduit for heat exchange liquid disposed within the bath and communicating with said heat exchanger, said conduits communicating with each other, a pump for circulating liquid in said conduits, valve means disposed in said conduits whereby flow may be restricted solely to the open conduit or to the closed conduit, and thermo-responsive means in the bath for adjusting the temperature of the bath by means of a second heat exchanger disposed in the bath, one of said heat exchangers being a cooling means for cooling said liquid and the other of said heat exchangers being a heating means for heating said liquid.

5. Apparatus as defined in claim 4, having a valve-controlled by-pass for short-circuiting a portion of the heat exchange liquid from the first heat exchanger.

6. Apparatus as defined in claim 4, having a reservoir for heat exchange liquid into which said first heat exchanger discharges, said reservoir being in communication with said conduits.

7. Apparatus as defined in claim 4, wherein said first-mentioned heat exchanger is adapted to reduce the temperature of liquid conducted therethrough, and said second heat exchanger is an electrical heater is disposed in said bath for automatically raising the bath temperature if excessively cooled.

8. In an apparatus of the character described, an open-top container, a heat exchanger, an open conduit for conducting heat exchange liquid from said container to said exchanger and back to said container, a closed conduit for heat exchange liquid, said conduit being disposed within said container and communicating with said heat exchanger, said conduits communicating with each other, means for circulating said liquid through the conduits, valve means for controlling the flow in the respective conduits, a second heat exchanger disposed in said container, and thermo-responsive means within said container for ajusting the temperature of the liquid within said container by actuating the second heat exchanger, one of said heat exchangers being a cooling means for cooling said liquid and the other of said heat exchangers being a heating means for heating said liquid.

References Cited in the file of this patent
UNITED STATES PATENTS

| | | |
|---|---|---|
| 2,490,759 | Tyden | Dec. 6, 1949 |
| 2,664,721 | Intagliata | Jan. 5, 1954 |